United States Patent Office 3,493,566
Patented Feb. 3, 1970

3,493,566
5-BENZOYLETHYL-6-CINNAMYL-
IDENEAMINOURACILS
Viktor Papesch, Morton Grove, Ill., assignor to G. D.
Searle & Co., Chicago, Ill., a corporation of Delaware
No Drawing. Filed Feb. 13, 1967, Ser. No. 615,382
Int. Cl. C07d 51/30; A61k 27/00
U.S. Cl. 260—240                                    5 Claims

ABSTRACT OF THE DISCLOSURE

The present 5-(1-phenyl-2-benzoylethyl)-6-(α-phenyl-cinnamylideneamino)uracils, additionally having substituents at the 1- and 3-positions, possess anti-inflammatory, anti-ulcer, anti-biotic, and analgesic activity. The compounds are prepared by the reaction of a 6-aminouracil with a chalcone.

SUMMARY OF THE INVENTION

The present invention relates to a group of complex substituted uracil compounds. In particular, the present invention relates to a group of compounds having the following general formula:

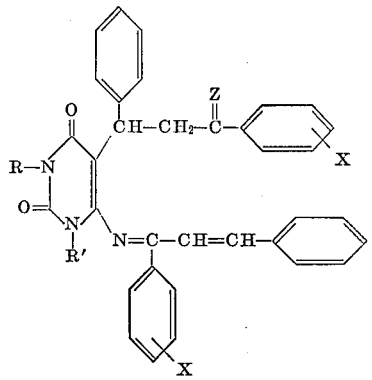

wherein R is selected from the group consisting of hydrogen and lower alkyl; R' is selected from the group consisting of lower alkyl, lower alkenyl, phenyl, and chlorophenyl; X is selected from the group consisting of hydrogen, methoxy, and halogen; and Z is selected from the group consisting of oxo and hydroxyimino.

The lower alkyl radicals referred to above contain up to 6 carbon atoms and are exemplified by radicals such as methyl, ethyl, propyl, butyl, pentyl, and hexyl. The lower alkenyl radicals referred to above likewise contain up to 6 carbon atoms and are exemplified by radicals such as allyl and methallyl. The halogen atoms referred to above include fluorine, chlorine, bromine, and iodine.

The compounds of this invention are useful because of their pharmacological properties. In particular, the present compounds possess anti-inflammatory activity. This is demonstrated by a phenylbutazone-like effect on edematous conditions. They also possess activity as pepsin inhibitors, anti-ulcer agents, analgesics, and anti-biotic agents. Thus, they inhibit the growth of protozoa such as *Tetrahymena gelleii*, and algae such as *Chlorella vulgaris*.

The compounds of the present invention are prepared from the appropriate 6-aminouracil which is otherwise unsubstituted in the 5 and 6 positions. The uracil is reacted with the appropriate chalcone (benzalacetophenone) in the presence of a catalytic amount of a quaternary ammonium base such as trimethylbenzylammonium hydroxide. The mixture can further be heated to promote the reaction.

The compounds of the present invention which are oximes are prepared by the reaction of the appropriate ketone with hydroxylamine hydrochloride.

The following examples are presented to further illustrate the present invention; they should not be construed as limiting it in spirit or in scope. In these examples, quantities are indicated in parts by weight unless parts by volume are indicated, and temperatures are given in degrees centigrade (° C.). The relationship between parts by weight and parts by volume is the same as that existing between grams and milliliters.

EXAMPLE 1

A mixture of 20 parts of 6-amino-1-methyluracil, 40 parts of chalcone, 5 parts by volume of trimethylbenzylammonium hydroxide and 1500 parts by volume of a 50% by volume pyridine-water mixture is heated on a steam bath for 100 minutes. The cooled mixture is then filtered and the solid separated in this way is washed and recrystallized from a 50% by volume pyridine-water mixture to give 1-methyl-5-(1-phenyl-2-benzoylethyl)-6-(α-phenylcinnamylideneamino)uracil melting at about 256–258° C. This compound has the following formula:

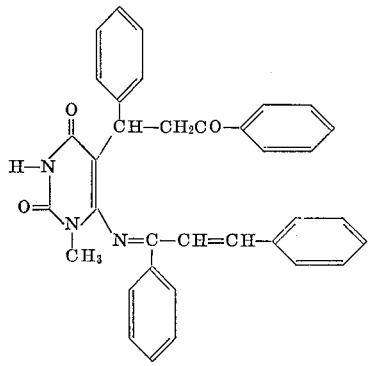

The corresponding 1-phenyl compound is obtained if the above procedure is repeated using 6-amino-1-phenyluracil.

EXAMPLE 2

A mixture of 10 parts of 1-methyl-5-(1-phenyl-2-benzoylethyl) - 6 - (α-phenylcinnamylideneamino)uracil, 50 parts of absolute ethanol, 60 parts of pyridine, and 8 parts of hydroxylamine hydrochloride is heated on a steam bath for almost 3 hours and then filtered. The solvent is evaporated from the filtrate under reduced pressure, absolute ethanol is added to the residue, the solvent is again evaporated under reduced pressure, and the addition and evaporation of ethanol is repeated. The residue is then dissolved in 400 parts of methanol and filtered. To this filtrate is added 500 parts of boiling water whereupon crystallization takes place. The mixture is then cooled and filtered and the separated solid is recrystallized from a mixture of methanol and water to give 1-methyl-5-(1-phenyl-2-benzoylethyl) - 6 - (α-phenylcinnamylideneamino)uracil oxime melting at about 247–248° C.

The filtrate obtained above after separation of the solid is concentrated to about 180 parts by volume and cooled and filtered. The precipitate is rinsed with water and then recrystallized from a mixture of methanol and water to give 1 - methyl - 5 - (1 - phenyl - 2 - benzoylethyl)-6-(α - phenylcinnamylideneamino)uracil oxime which melts at about 229–231° C. and is isomeric with the oxime whose isolation is described in the preceeding paragraph.

EXAMPLE 3

To a solution of 10 parts of 1 - (4 - chlorophenyl - 3 - methyl - 6 - aminoracil in 115 parts by volume of 65% pyridine in water, there is added 10 parts of chalcone and 1 part of trimethylbenzylammonium hydroxide. The mixture is allowed to stand for 30 minutes and then cooled and filtered and the separated solid is washed with 70% pyridine in water. The precipitate is then recrystallized from methanol to give 1 - (4 - chlorophenyl) - 3 - methyl- 5 - (1 - phenyl - 2 - benzoylethyl) - 6 - (α - phenylcinnamylideneamino)uracil melting at about 210–212° C. This compound has the following formula:

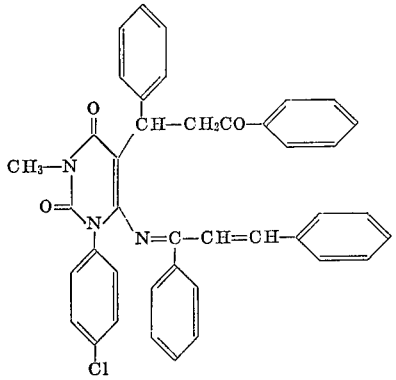

EXAMPLE 4

A mixture of 5 parts of 1 - (4 - chlorophenyl) - 3 - methyl - 5 - (1 - phenyl - 2 - benzoylethyl) - 6 - (α - phenylcinnamylideneamino) - uracil, 10 parts of absolute ethanol, 30 parts of pyridine, and 4 parts of hydroxylamine hydrochloride is heated on a steam bath for 3 hours. The mixture is then filtered and the solvent is evaporated from the filtrate. Absolute ethanol is added to the residue and the solvent is evaporated and this process is repeated. The residue is then dissolved in 25 parts of methanol and filtered and the filtrate is diluted with methanol to a volume of 50 parts. 16 parts of water is added and a precipitate forms. This is separated by filtration and rinsed with water to give 1 - (4 - chlorophenyl) - 3 - methyl - 5 - (1-phenyl - 2 - benzoylethyl)-6- (α - phenylcinnamylideneamino)uracil oxime which becomes transparent at about 142–150° C.

EXAMPLE 5

A mixture of 3 parts of 1,3 - diethyl - 6 - aminouracil, 17 parts by volume of a 50% by volume pyridine - water mixture, and 4 parts of chalcone is heated on a steam bath for 2 hours. Two layers are present at the end of the heating and the mixture is allowed to stand at room temperature. A crystalline material appears in the bottom layer and this is separated by filtration and washed with acetone. This solid is ground up with a small amount of methanol and hexane and then filtered to give a product melting at about 170–171° C. This product is 1,3-diethyl - 5 - (1 - phenyl - 2 - benzoylethyl) - 6 - (α-phenylcinnamylideneamino)uracil.

EXAMPLE 6

A solution is prepared from 14.5 parts of 6 - amino-1-allyl - 3 - ethyluracil, 14.5 parts of chalcone and 100 parts by volume of a 70% by volume pyridine in water mixture, and 0.75 part by volume of trimethylbenzylammonium hydroxide is added. The temperature of the mixture rises spontaneously to about 35° C. and it is maintained at that temperature for 2.5 hours. The solvent is then evaporated under reduced pressure and the residue is taken up in a methanol-water mixture and allowed to stand for 3 hours. A precipitate forms and is removed by filtration. The filtrate is allowed to stand for about 24 hours; a further precipitate forms. This is separated by filtration and washed with methanol to give 1 - allyl - 3 - ethyl - 5 - (1 - phenyl - 2 - benzoylethyl) - 6 - (α- phenylcinnamylideneamino)uracil melting at about 128–130° C.

EXAMPLE 7

A mixture of 5 parts of 6 - amino - 1 - (4 - chlorophenyl)-3-methyluracil, 50 parts by volume of a 50% by volume pyridine-water mixture, 10 parts of 3' - methoxychalcone and 1 part of trimethylbenzylammonium hydroxide is stirred and heated to 63° C. The reaction mixture is a fairly heavy suspension at the end of 45 minutes. It is then cooled and allowed to stand before it is filtered. The filtrate is then stored in ice overnight and filtered again. The filtrate is then concentrated and cooled and the precipitate which forms is separated by filtration and washed with water to give 1 - (4 - chlorophenyl) - 3-methyl - 5 - [1 - phenyl - 2 - (3 - methoxybenzoyl)ethyl]- 6 - [α-(3 - methoxyphenyl)cinnamylideneamino]uracil melting at about 197–198° C.

If the above procedure is repeated using 4' - chlorochalcone, the product is 1 - (4 - chlorophenyl) - 3 - methyl - 5 - [1 - phenyl - 2 - (4 - chlorobenzoyl)ethyl]-6-[α(4 - chlorophenyl)cinnamylideneamino]uracil.

What is claimed is:

1. A compound of the formula:

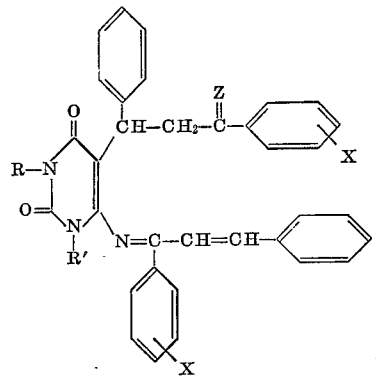

wherein R is selected from the group consisting of hydrogen and lower alkyl; R' is selected from the group consisting of lower alkyl, lower alkenyl, phenyl, and chlorophenyl; X is selected from the group consisting of hydrogen, methoxy, and halogen; and Z is selected from the group consisting of oxo and hydroxyimino.

2. A compound according to claim 1 which is 1-allyl-3 - ethyl - 5 - (1 - phenyl - 2 - benzoylethyl) - 6 - (α-phenylcinnamylideneamino)uracil.

3. A compound according to claim 1 which is 1 - (4-chlorophenyl) - 3 - methyl - 5 - (1-phenyl - 2 - benzoylethyl) - 6 - (α-phenylcinnamylideneamino)uracil.

4. A compound according to claim 1 which is 1-(4-chlorophenyl) - 3 - methyl - 5 - (1-phenyl - 2 - benzoylethyl)-6-(α-phenylcinnamylideneamino) uracil oxime.

5. A compound according to claim 1 which is 1-(4-chlorophenyl) - 3 - methyl - [1-phenyl - 2 - (3 - methoxybenzoyl)-ethyl]-6-[α-(3 - methoxyphenyl)cinnamylideneamino]uracil.

References Cited

UNITED STATES PATENTS 3,429,878    2/1969    Pachter et al. _____ 260—240

OTHER REFERENCES

Traube et al. Ber. Deut. Chem. vol. 39, pp. 227 to 229 and 232 (1906).

JOHN D. RANDOLPH, Primary Examiner

U.S. Cl. X.R.

260—999

References Cited

UNITED STATES PATENTS

| | | | |
|---|---|---|---|
| 3,303,188 | 2/1967 | Takai et al. | 260—240 |
| 3,352,683 | 11/1967 | Schmidt et al. | 260—240 |

FOREIGN PATENTS 1,025,439   4/1966   Great Britain.

OTHER REFERENCES

Fujita et al.: J. Pharm. Soc. Japan, vol. 86, pp. 427–432 (1966).

Chemical Abstracts I, vol. 62, cols. 4024–4025 (1965) (abstract of Eloy et al.).

Chemical Abstracts II, vol. 64, cols. 5073–5074 (February 1966) (abstract of Saikawa et al.).

JOHN D. RANDOLPH, Primary Examiner

U.S. Cl. X.R.

424—272, 248; 260—307